United States Patent [19]

Duggal et al.

[11] Patent Number: 4,553,504

[45] Date of Patent: Nov. 19, 1985

[54] MEANS AND METHOD FOR ALTERNATE FUEL FUMIGATION IN INTERNAL COMBUSTION ENGINES

[75] Inventors: Vinod K. Duggal; Edward J. Lyford-Pike, both of Columbus; Edward D. Smith, Greensburg, all of Ind.

[73] Assignee: Cummins Engine Company, Inc., Columbus, Ind.

[21] Appl. No.: 567,179

[22] Filed: Dec. 30, 1983

[51] Int. Cl.⁴ .................................. F02M 25/04
[52] U.S. Cl. .................. 123/25 J; 123/1 A; 123/559
[58] Field of Search ............ 123/1 A, 516, 559, 25 J; 60/605

[56] References Cited

U.S. PATENT DOCUMENTS

| 2,129,930 | 9/1938 | Hans | 123/527 |
|---|---|---|---|
| 2,369,665 | 2/1945 | Gosslau | 261/28 |
| 2,616,404 | 11/1952 | Bartholomew | 123/527 |
| 3,665,905 | 5/1972 | Brille et al. | 123/559 |
| 4,182,294 | 1/1980 | Emmenthal | 60/605 |
| 4,342,287 | 8/1982 | Concepcion | 123/1 A |
| 4,376,433 | 3/1983 | Spakowski | 123/478 |
| 4,380,974 | 4/1983 | Grosso | 123/179 G |
| 4,385,615 | 5/1983 | Keane | 123/516 |
| 4,444,166 | 4/1984 | Kovacs et al. | 123/1 A |
| 4,459,943 | 7/1984 | Goodman | 123/255 |

FOREIGN PATENT DOCUMENTS 148643  11/1981  Japan ........................ 123/1 A

OTHER PUBLICATIONS

"Effect of Alcohols as Supplemental Fuel for Turbocharged Diesel Engines" Barnes et al., 2/1975, pp. 1–9.
M. Retel, "Utilization of Alcohol as Motor Fuel by Director Injection", The Engineer's Digest, Dec. 1945, pp. 598–602.

Primary Examiner—E. Rollins Cross
Attorney, Agent, or Firm—Sixbey, Friedman & Leedom

[57] ABSTRACT

A system for effecting alternate fuel fumigation in an internal combustion engine including a fuel injector nozzle located in a scroll of a supercharger compressor associated with the engine. Schedules of secondary fuel addition as a function of engine load and as a function of engine speed are also disclosed as are fluid circuits used to effect such alternate fuel addition schedules.

28 Claims, 16 Drawing Figures

MEANS AND METHOD FOR ALTERNATE FUEL FUMIGATION IN INTERNAL COMBUSTION ENGINES

TECHNICAL FIELD

The present invention relates, in general, to internal combustion engines, and, more particularly, to fuel injection systems for such engines.

BACKGROUND ART

Increasing concern about supply shut-off possibilities, steady increase in crude petroleum prices, lack of local indigenous petroleum resources, and desire to become energy independent has resulted in an increased interest in the exploration of alternative fuels which can be used in place of or as a supplement to the fuels currently available, such as gasoline and diesel fuel.

This increased interest in alternative fuels has resulted in experimental uses of such alternative diesel fuels as coal liquids and vegetable oils, and, in some isolated cases, some internal combustion engines have even been operated on solid fuels. This interest has also generated research in the area of fuel additives to increase engine output over that obtainable with heretofore known fuel-air mixtures.

However, at the present time, it appears that alcohols have produced the best results when used as an alternative fuel or as a substitute. Even though the use of alcohol as an automotive fuel has been known for a long time, and ethanol blended with gasoline has been used in locations where it is plentiful a a by-product of sugar refining, pulp manufacture or some similar industry, the use of alcohol in diesel engines as a complete or partial substitution of diesel fuel has been investigated with increasing intensity in the last five to ten years.

Both ethanol and methanol have been looked upon favorably for their ability to produce power and reduce smoke emissions by partial substitution, and alcohols are now seen as potential candidates to reduce diesel fuel consumption in case of emergency or in their own merit as effective alternate fuels.

There are various experimental methods known for using alcohol in diesel engines. These include surface ignition, alcohol with cetane improvers, fumigation, dual injection, and emulsification. The first two methods require engine operation with alcohol alone as fuel. The other three techniques need some amount of diesel fuel to start ignition and/or to control combustion. The techniques differ in the way alcohol is introduced into the engine, thus: alcohol is introduced with the intake air in the fumigation technique; dual-fuel injection employs two separate injection systems, one for alcohol and the other for diesel fuel; and with emulsification, alcohol and diesel fuel are injected into the combustion chamber as a prepared emulsion.

Each of these techniques requires specific modifications to adapt the necessary equipment to the engine, and thus each has certain problems; e.g., fuel system compatibility with alcohol or physical space in the cylinder head for a second injector. Fumigation, however, requires less major modifications than any of the above mentioned techniques, and offers a potential for a retrofit kit for power units in case of fuel emergency. Engines modified for fumigation can also be easily readapted to run on diesel fuel alone.

Fumigation, as used herein, is a process where a part of the fuel in a diesel engine is supplied by alcohol through engine air intake. The remaining diesel fuel is delivered normally by a high-pressure injection system into the engine cylinder. The energy released from alcohol addition reduces the diesel fuel consumption, and thus fumigation presents a relatively easy method to burn lower proof alcohol without requiring major engine modifications.

Diesel spray ignition permits leaner alcohol/air mixture combustion than is usually attainable by spark ignition, therefore, in this respect, fumigation resembles certain types of stratified charge operations where an over-lean premixed charge is ignited by a rich burning jet.

A number of fumigation systems have been investigated prior to recent interest in alcohol fuels. Then, an important objective was to achieve increased smoke-limited power. These fumigation systems are briefly discussed below.

In-line heated vaporizer

The vaporizer consists of a heated metal container in the intake air supply line. Liquid alcohol evaporates when dropped on the container bottom and then mixes with an intake air stream. Some alcohol droplets can also be carried by the air stream. The heating of the container results in a penalty of higher intake air temperature, reducing volumetric efficiency.

Auxiliary mist generator

A "micro-fog" of alcohol mist (droplet size less than 4 microns) produced by a mist generator is used to convey alcohol to the air intake manifold.

Carburetor

A conventional carburetor is employed to supply an alcohol/air mixture to the engine. However, with this method of fumigation, it is necessary to throttle a pair of the air flow to ensure adequate air supply through the carburetor, and this may present problems. the carburetor can also be preceded by a heat exchanger to transfer heat from the exhaust gas to the intake air.

Direct Manifold Injection

This method of fumigation has been used in some recent experiments, and has been proposed as a method for an engine retrofit kit. In this arrangement, alcohol is injected directly into the intake manifold. The injection is possible at a number of positions; e.g., upstream of a turbocharger, downstream of the compressor, before or after the aftercooler and immediately upstream of individual inlet ports. In the last case several injectors are required, one for each cylinder. The location and arrangement of spray nozzles strongly influence engine performance, and thus may present design and performance problems.

The orientation of nozzles relative to the intake air stream has noticeable effects; e.g., injecting alcohol against the air flow increases the relative velocity many times compared with parallel flow and thus significantly increases the vaporization, and high intake air velocities may be required to aerodynamically shatter and vaporize the injected alcohol, therefore presenting more potential design and performance problems.

For turbocharged engines, high-pressure injection equipment can be used to inject a fine spray of alcohol ahead of the turbocharger, but this is an expensive arrangement. A less costly arrangement is to use air from the compressor to introduce liquid alcohol ahead of the turbocharger. This method, however, has been reported to damage the compressor wheel of the turbocharger as a result of droplets impacting this high speed component.

Alcohol Injection System Control

This system is similar to a diesel injection system. Manifold injection of alcohol, continuous or pulsed, can be controlled by mechanical or electronic and hydraulic means, and alcohol flow rates must be controlled for various speeds and loads to optimize diesel fuel replacement. However, this system may become complex and expensive.

Thus, there are drawbacks to each of the above-discussed known fumigation systems.

As discussed above, fumigation is an effective way to efficiently utilize alcohol as an alternative fuel or as an additive. To achieve the fullest possible benefits of fumigation, a fumigation configuration and schedule in a diesel engine should produce the highest possible alcohol substitution with the best thermal efficiency possible.

Presently known fumigation systems for diesel engines do not appear to account for all of the factors pertinent to efficient fumigation, and therefore do not perform as efficiently and as reliably as possible and therefore do not appear to achieve the fullest possible benefits for fumigation.

Thus, while alcohol as a fuel has long been recognized, see, e.g., M. Retel, "Utilization of Alcohol as Motor Fuel by Director Injection," *The Engineer's Digest,* December 1945, pages 598-602, and fuel additives have been used in spark ignition engines by devices such as is disclosed in U.S. Pat. No. 2,616,404 which injects fluid into a carburetor based on carburetor air flow, such devices and disclosures do not appear to be concerned with means and methods of fumigation.

This shortcoming is overcome by disclosures such as Brille, et al, U.S. Pat. No. 3,665,905 and M. Alperstein, et al, "Fumigation Kills Smoke, Improves Diesel Performance," Trans. SAE 66, 574 (1958) which are directed to fumigation per se. However, Alperstein used an in-line heated vaporizer, an auxiliary mist generator, a carburetor and pneumatic manifold injection for fumigation and found large performance variations, and Brille et al injection fuel upstream of the inlet of a pump which is then subjected to possible damage.

The device disclosed by Gosslau in U.S. Pat. No. 2,369,665 injects fuel into the casing of an air blower to be mixed with air injested into that blower so a mixture in a gaseous state is moved to an engine inlet, and thus appears to avoid problems associated with fuel injection upstream of the inlet of such air blowers. However, this patent does not appear to discuss problems associated with fumigation in a diesel engine, nor does this patent appear to approach problems associated with injecting fuel in accordance with the amount of a primary fuel injected as the device disclosed in Gosslau injects only one fuel, and controls the amount of this fuel injected according to air inlet pressure only.

Thus, there is need for a means for efficiently carrying out fumigation in a diesel engine.

In addition to requiring proper placement of the apparatus associated with a fumigation system, such a system should account for the quantity of alcohol fuel injection whereby the alcohol is utilized in an efficient manner. The above-discussed considerations are pertinent to developing an alcohol injection schedule which makes efficient use of fumigation.

While it is known in the spark ignition field to inject auxiliary fluids during high power operation, see Hans, U.S. Pat. No. 2,129,930, or according to carburetor air flow, see U.S. Pat. No. 4,380,974, such disclosures may not account for all of the considerations involved in fumigation of diesel engines.

Spakowski, in U.S. Pat. No. 4,376,433, discloses a supplemental fuel injection system for incorporating supplemental fuel into the air or air-fuel mixture flowing through a carburetor. This system overcomes some of the deficiencies discussed above by accounting for various engine operating parameters such as engine load and throttle position, such a system appears to be intended for use with spark ignition type engines and supplies only one fuel at a time to the engine and thus still does not appear to account for all of the problems and considerations necessary to design an efficient fumigation system for a diesel engine.

The Spakowski patent also discloses use of a microcomputer to control flow in the supplemental fuel injection system, and patents such as Grosso, U.S. Pat. No. 4,380,974 and Concepcion, U.S. Pat. No. 4,342,287 disclose mechanical linkages to control flow of fluid in a supplemental fuel system. However, these devices do not appear to be adequate to fully account for a proper secondary fuel utilization schedule which will perform efficient fumigation in a diesel engine.

DISCLOSURE OF THE INVENTION

It is the primary object of the present invention to provide a novel fuel replacement system which produces the highest possible substitution of a secondary fuel for a primary fuel in an internal combustion engine while achieving the best possible engine efficiency.

It is another object of the present invention to provide a novel fuel replacement system which optimizes the mixing and distribution of the secondary fuel.

It is another object of the present invention to provide a novel fuel replacement system which is easily retrofitted on any vehicle, including four wheel drive vehicles and vehicles which do not have compressed air on board and does not interfere with original intake air flows.

It is a further object of the present invention to provide a novel fuel replacement system for a supercharged internal combustion engine which includes a secondary fuel injection nozzle located in a compressor in a position which is not likely to damage a compressor impeller.

It is a further object of the present invention to provide a novel fuel replacement schedule which accounts for secondary fuel utilization, durability, safety, engine RPM, engine load, type of injector, location of injector, exhaust properties including emissions, such as smoke and unconsumed secondary fuel, ignition delay, combustion and detonation characteristics, intake manifold conditions, flow characteristics, heat transfer characteristics, cylinder pressure and temperature and injection angle as well as retrofit capability. Certainly, a proper fumigation schedule should account for reduced flow of primary fuel to the engine during injection of secondary fuel, and should account for the effects of such reduced flow on engine performance.

It is yet another object of the present invention to provide a novel fuel replacement system which is controlled to supply secondary fuel to an internal combustion engine according to a schedule which relates secondary fuel pressure to primary fuel pressure according to a fixed control relationship.

It is yet another object of the present invention to provide a novel fuel replacement system which is controlled to withhold secondary fuel from the engine until engine load reaches a first predetermined percentage of full load, then gradually increases the amount of secondary fuel flowing to the engine until a first predetermined percentage of the total fuel energy flowing to the engine, at a second predetermined percentage of full load is secondary fuel, then diminishes the flow of secondary fuel to the engine to be a second predetermined percentage of the total fuel energy flowing to the engine at full engine load.

It is yet another object of the present invention to provide a novel fuel replacement system which is controlled according to engine speed as well as engine load.

It is yet another object of the present invention to provide a novel fuel replacement system which permits the engine to be run on primary fuel exclusively at any time.

It is yet another object of the present invention to provide a novel fuel replacement system which requires secondary fuel when the engine is being operated at greater than 25% of full load.

BEST MODE FOR CARRYING OUT THE INVENTION

Figure 1:
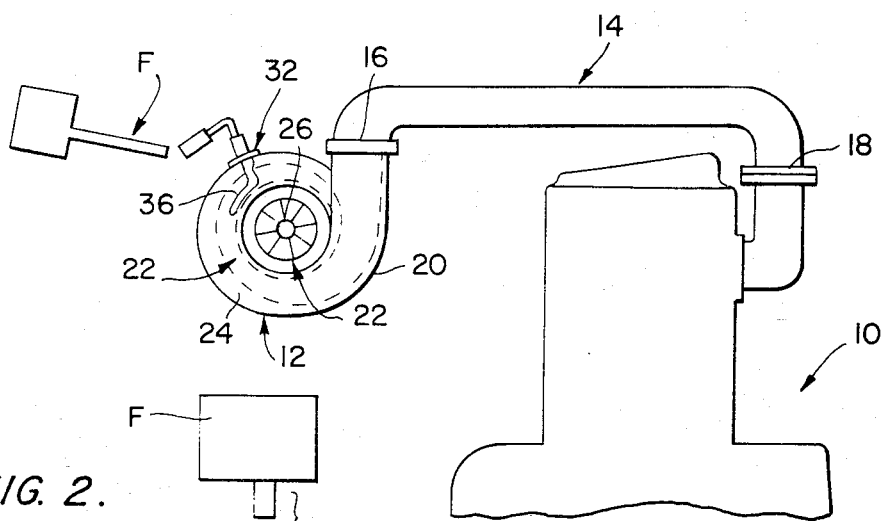
FIG. 1 is a schematic showing a fumigation system for an internal combustion engine embodying the teachings of the present invention.

As shown in FIG. 1, an internal combustion engine 10 includes a supercharger which includes a compressor 12 fluidly associated therewith via conduit 14 connecting compressor exit 16 with engine air intake 18. The supercharger is preferably a turbocharger and the engine 10 preferably is a diesel engine manufactured by Cummins Engine Company of Columbus, Ind., which as best shown in FIGS. 7-10, includes a Cummins PT (R) fuel pump as described in U.S. Pat. No. 3,951,117 issued Apr. 20, 1976 to J. P. Perr and assigned to Cummins Engine Co., Inc of Columbus, Ind., and in Bulletin No. 3387213 "PT Fuel System Theory and Operation" by said Cummins Engine Company, printed 12/82, fluidly coupled to a rail injector system R, a usual key switch K operating the engine, and an alcohol preference switch S operating the alcohol fumigation system. These elements will be discussed in greater detail below, but are introduced here for the sake of convenience.

The supercharger compressor 21 is a centrifugal type compressor and includes a scroll 20 and impeller 22 spaced from the scroll 20 to define a compressor scroll region 24. The supercharger compressor 12 operates in a known manner to compress air, or a combustion mixture of fuel and air, and deliver such compressed fluid to the cylinders of engine 10 at a pressure greater than atmospheric pressure. As is usual to such supercharger compressors, fluid enters an inlet 26 and passes into the impeller 22 where part of the pressure rise of the fluid flowing through the supercharger compressor occurs as a result of radial flow of the fluid induced by centrifugal force. The fluid leaving the impeller 22 has a high velocity, and when this velocity is reduced by scroll 20, the pressure is again increased.

Figure 2:
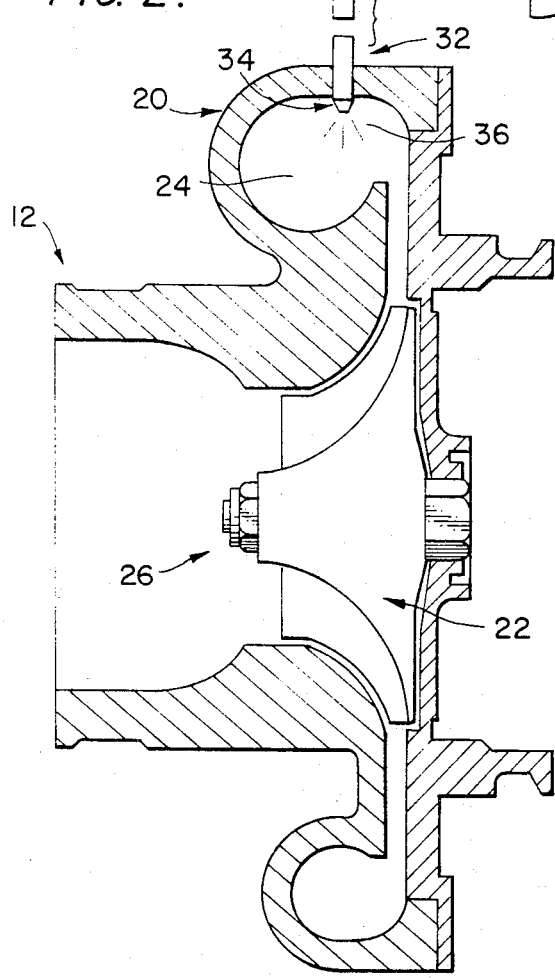
FIG. 2 is an elevation view of a supercharger compressor with an injection nozzle mounted thereon in accordance with the teaching of the present invention.
Figure 3:
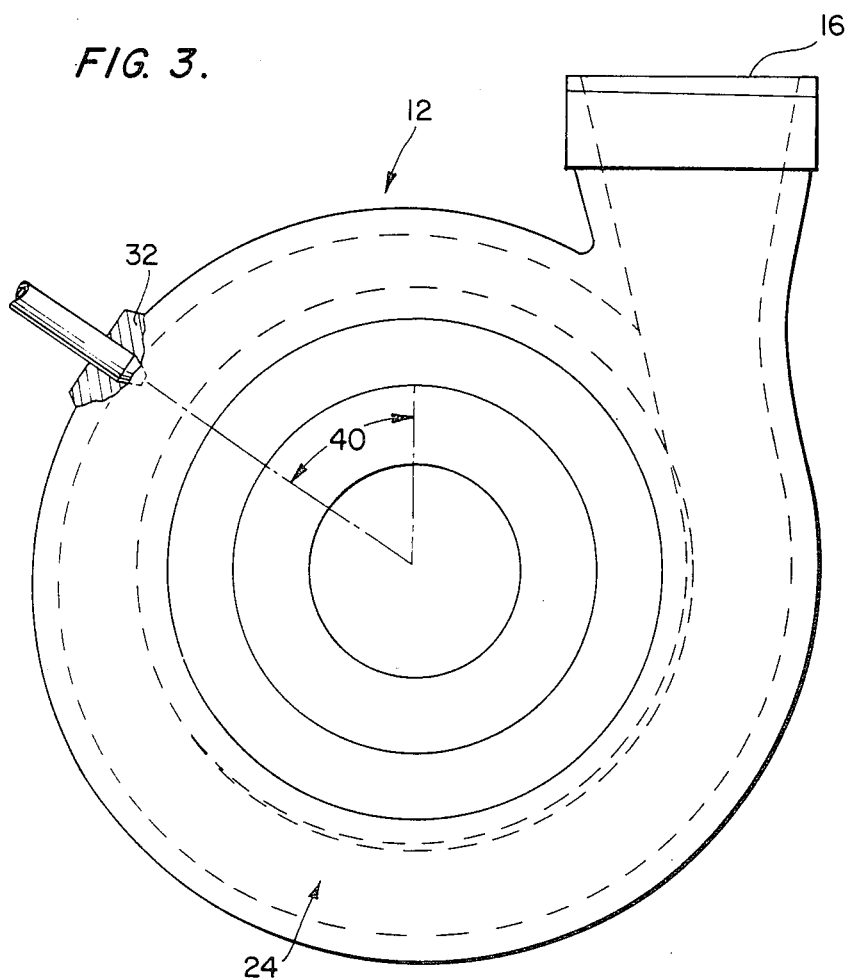
FIG. 3 is a top plan view of a supercharger compressor with an injection nozzle mounted thereon in accordance with the teaching of the present invention.

As indicated schematically in FIGS. 1 and 2, a fumigation system F is fluidly associated with the engine 10 via the supercharger compressor 12. The fumigation system F will be discussed in greater detail below with regard to FIGS. 7-10. The fumigation system F includes an injection nozzle 32 mounted on the supercharger compressor scroll 20 to have the outlet 34 thereof located in the scroll region 24 to inject secondary fuel 36, such as alcohol, into the scroll region 24 of the supercharger compressor 12. As best shown in FIG. 3, the injection nozzle 32 is offset from a 12 o'clock position on the supercharger compressor as shown in FIG. 3, by an angle 40 and a preferred value of angle 40 is 56°.

The injection nozzle 32 can include atomizing nozzles which atomize using liquid pressure or air. A liquid injection nozzle is preferable in engine applications which do not have compressed air on board, but can be used in other applications as well. A preferred air atomization nozzle produces droplet sizes in the range of about 20 microns to about 40 microns, but other air atomization nozzles can be used where suitable. It has been found that by locating injection nozzle 32 in the scroll region 24, the high velocity air in the region of the nozzle provides good alcohol mixing and therefore good cylinder distribution without damaging the impeller 22. It has also been found that air velocity in the vaneless diffuser region of the supercharger compressor 12 can be around 200 ft/sec, and if the injection nozzle outlet 34 is located about 2 inches from the impeller 22, it will be less likely for the alcohol to contact the impeller 22.

Figure 4:
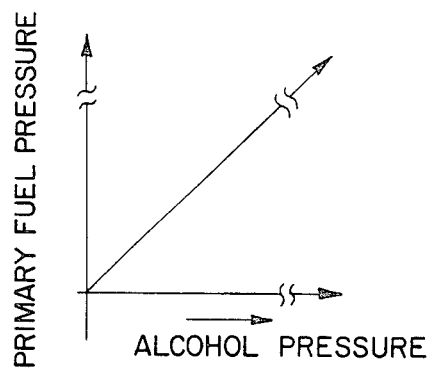
FIGS. 4–6a–d are graphical representations of a fumigation schedule embodying the teaching of the present invention.
Figure 5:
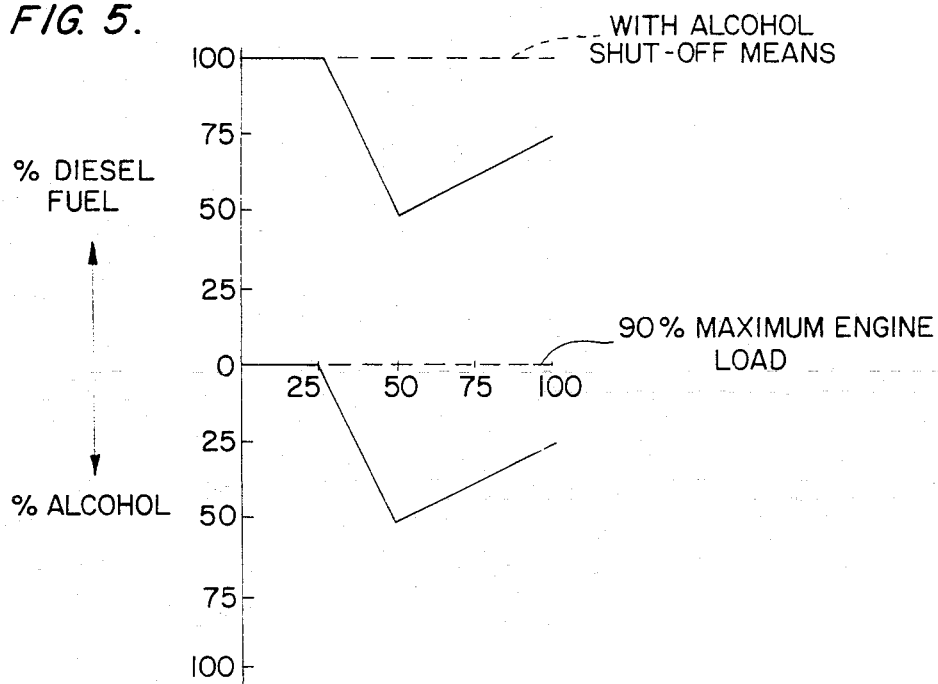
Figure 6A:
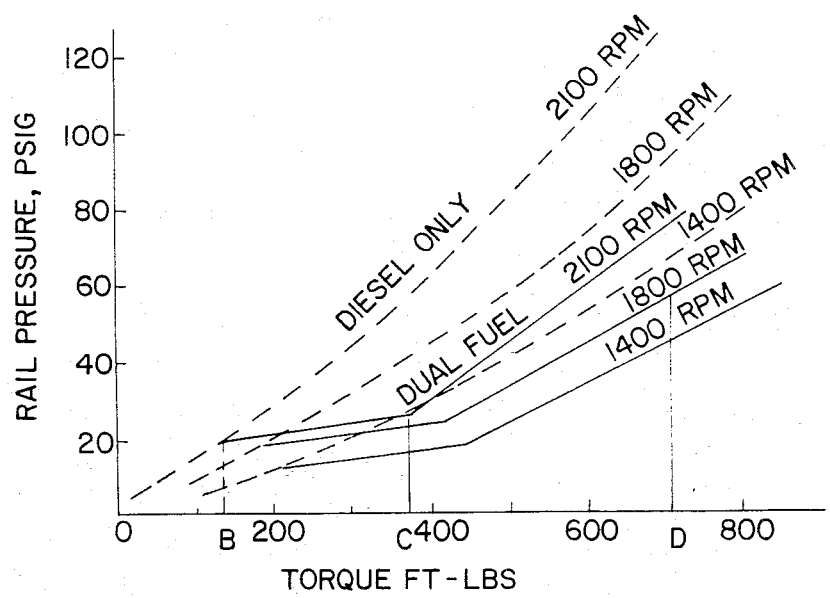
Figure 6B:
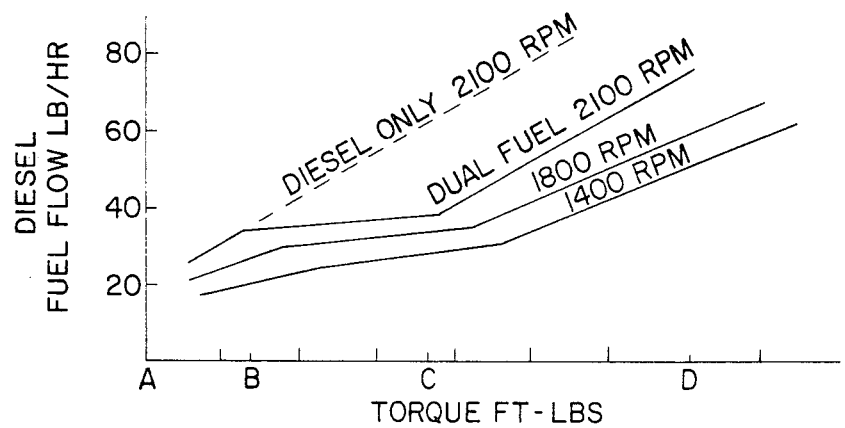
Figure 6C:
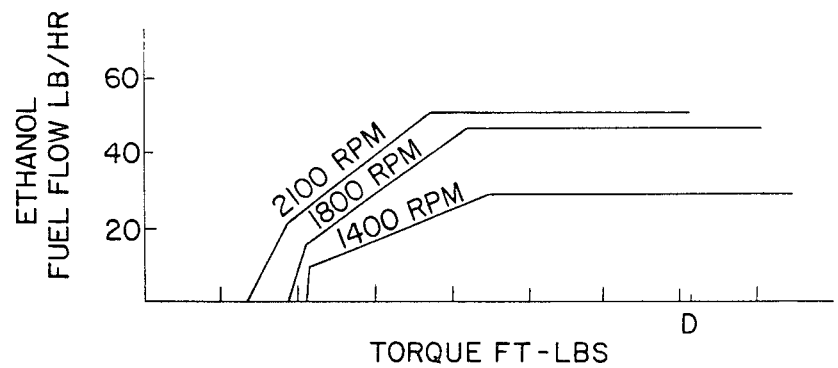
Figure 6D:
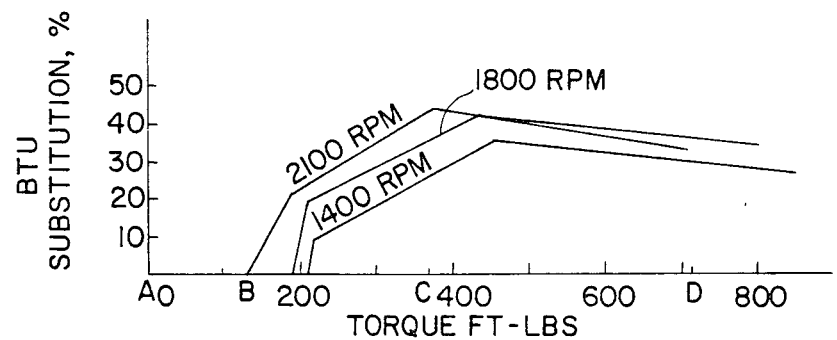

Referring now to FIGS. 4 and 5, an optimum fumigation schedule which accounts for all of the above-discussed factors will now be prsented. FIG. 4 shows a fumigation schedule wherein pressure in the alcohol fuel system is balanced against diesel fuel pressure in the primary fuel injection system so that if an alcohol pressure curve has the same shape as the primary fuel pressure curve, the alcohol will supply essentially a fixed percentage of the engine total fuel requirements.

FIG. 5 shows a fumigation schedule wherein no alcohol is added until engine load reaches 25% of full engine load, then alcohol is added to gradually build up the amount of alcohol in the fluid flowing into the cylinders so that when engine load is 50% of full load, 50% of the total fuel energy flow into each of the cylinders is alcohol, then, after engine load exceeds 50% of full load, the amount of alcohol added is gradually diminished to make up 25% of the total flow to each of the cylinders at full engine load. The phantom lines of FIG. 5 indicate the results obtained using the alcohol preference switch S. When the switch S is in the alcohol addition mode, the fumigation schedule is as just described; however, when the fumigation system F is shut off by the switch S, all of the engine power is derived from diesel fuel alone as indicated by the phantom lines in FIG. 5.

FIG. 5 depicts the preferred substitution schedule, at, for example 2100 RPM engine speed, but other similar schedules are appropriate for other engine speeds, such as 1800 RPM and 1400 RPM. Various substitution schedules are shown in FIG. 6.

The engine needs to be started and run at light loads with diesel fuel only (Sections A-B on the horizontal axis of FIG. 6). As the rail injection system pressure increases, alcohol will be added at increasing quantities and diesel fuel addition maintained almost constant (Section B-C). For further increases in primary fuel pressure (Section C-D), alcohol flow will preferably be constant and diesel flow varied.

Schematics of a type of system that provides this kind of control are shown in FIGS. 7-10. The main element is a flow control valve that tracks the primary fuel pressure and regulates the alcohol flow. In this manner, any change in primary fuel injector system pressure due to throttle, governor, or AFC operation causes a corresponding change in alcohol pressure. The engine diesel fuel quantity will be automatically reduced when the operator switches alcohol preference switch S to the diesel-alcohol mode.

Figure 7:
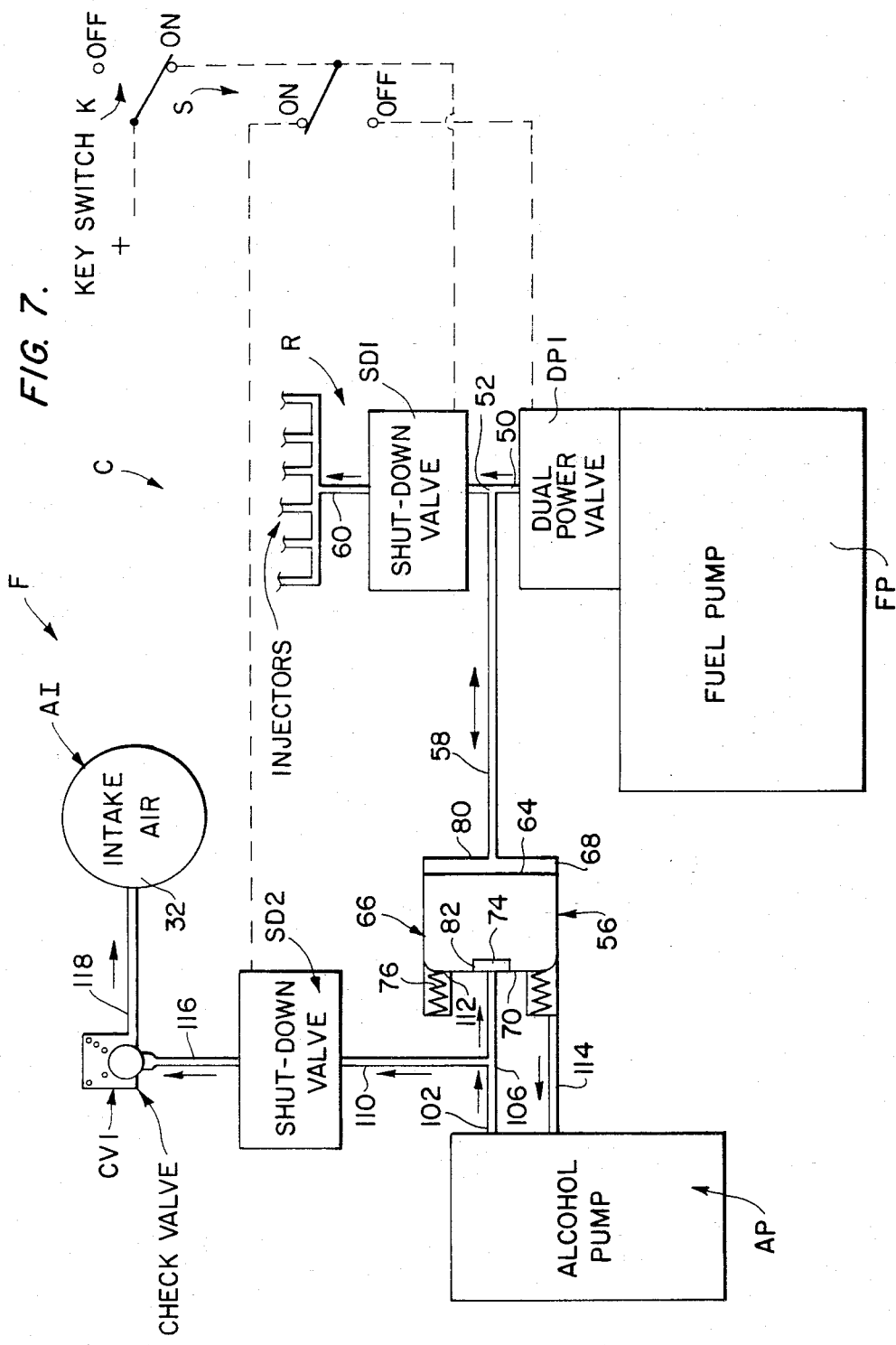
FIG. 7 is a schematic representation of a fluid circuit used in a fumigation system in accordance with the present invention wherein alcohol pressure is balanced against primary fuel pressure.

The fumigation system F includes a control system for effecting the just discussed fumigation schedule. Referring now to FIG. 7, a fumigation control system C is shown which controls alcohol flow according to the relationship shown in FIG. 4, that is, pressure of the alcohol delivered to the nozzle 32 in air intake means AI by alcohol pump AP is balanced against pressure of the fuel delivered to the combustion chambers by the diesel fuel rail injector system R Diesel fuel from the vehicles fuel pump FP is supplied via a dual power valve DP1 to a primary supply line 50 which branches at a T 52 to a shut-down valve SD1 which is controlled by main engine switch K, and to a main alcohol control valve 56 via a conduit 58. Diesel fuel is supplied to the rail injector system R from the shut-down valve SD1 via supply line 60, and the dual power valve DP1 restricts the pressure of diesel fuel by an amount proportional to the amount of alcohol injected by the fumigation system F. Pressure in the diesel fuel supply system is thus applied to the main alcohol control valve 56 and is applied to a first face 64 of a piston 66 of that valve 56. The piston 66 is movably positioned in a case 68 and has a second face 70 which has a counterbore 74 defined therein, and a spring 76 yieldably biases the piston 66 toward end 80 of the case 68 to prevent alcohol injection during engine idle. The effect of spring 76 is shown in FIG. 4 by the offset x along the x-axis of the figure. The counterbore 74 has an end face 82 having an area A1, whereas first face 64 has an area A2. The significance of these areas, and the relationship therebetween will be evident from the discussion below.

Figure 8:
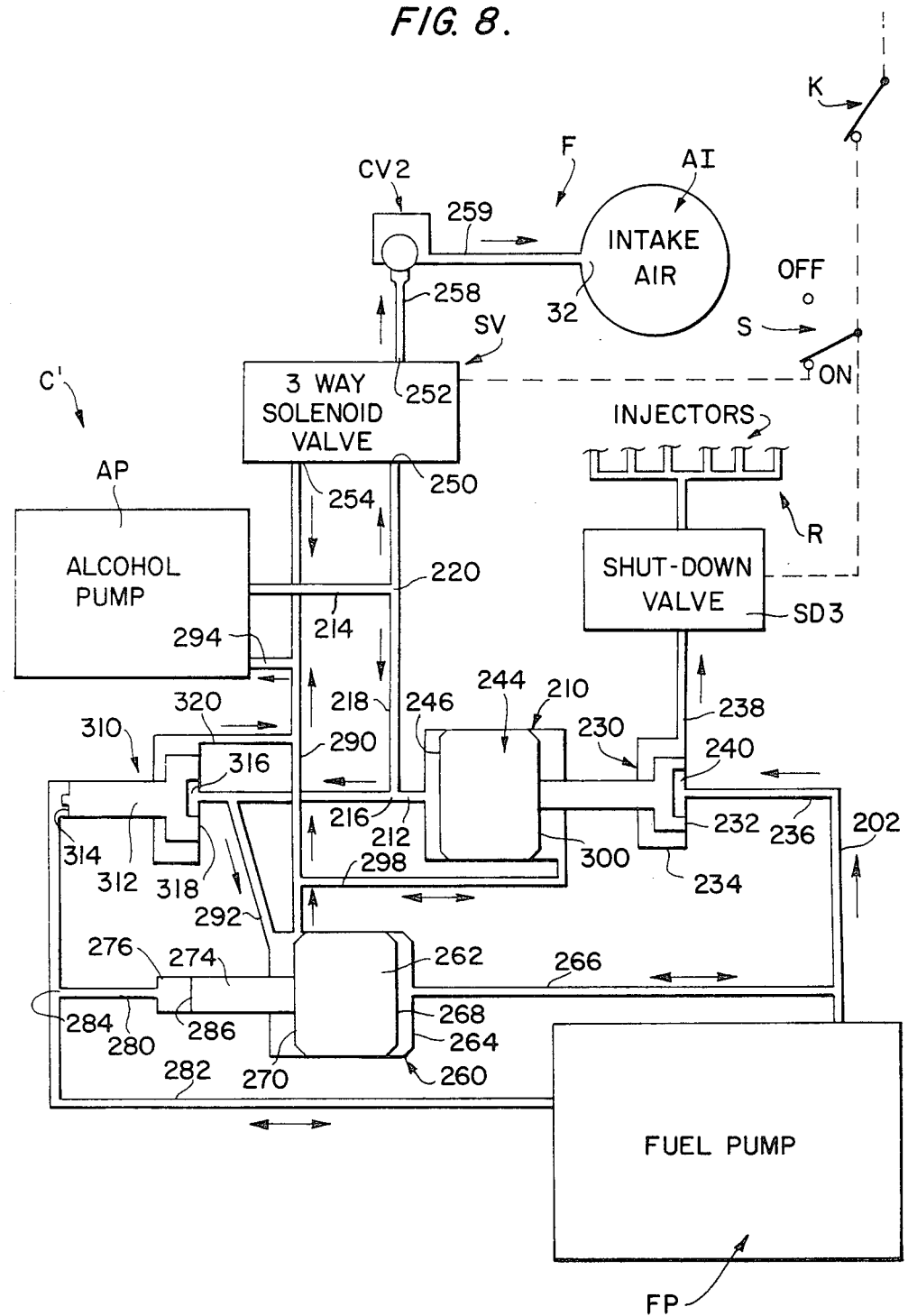
FIG. 8 is a schematic representation of a fluid circuit used in a fumigation system in accordance with the present invention wherein two regulators are used.
Figure 9:
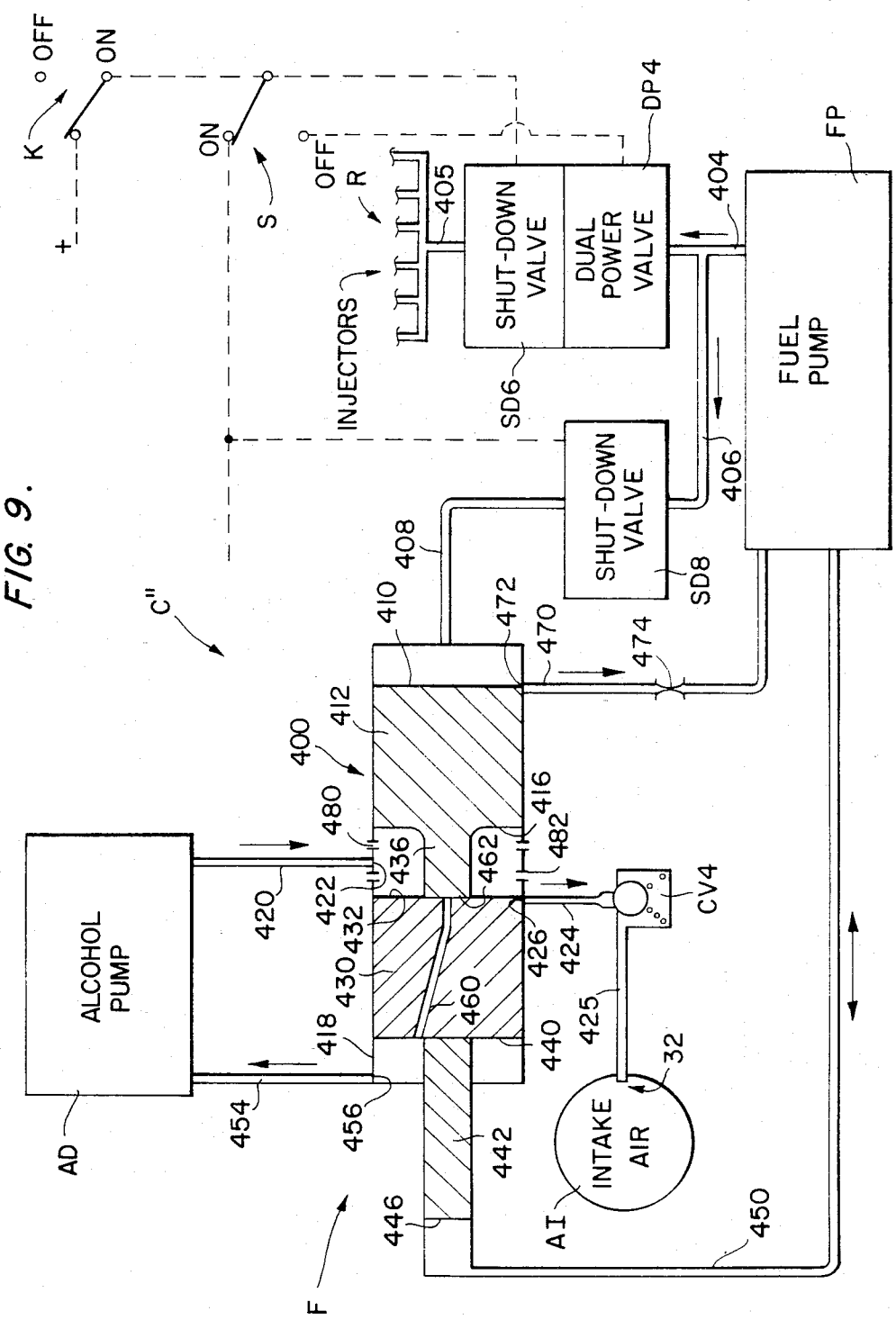
FIG. 9 is a schematic representation of a fluid circuit used in a fumigation system in accordance with the present invention wherein a three plunger single regulator is used.
Figure 10:
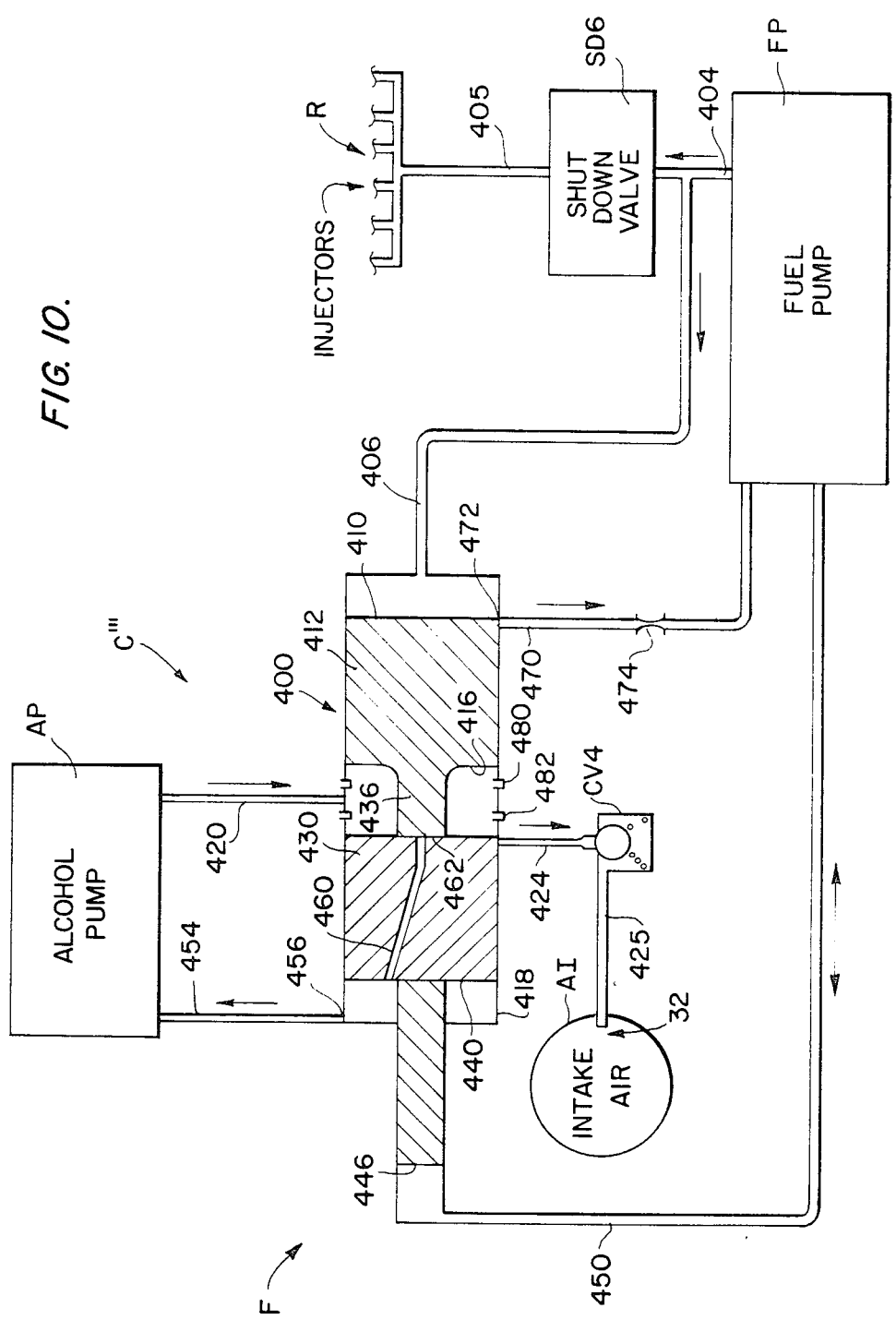
FIG. 10 is a schematic representation of a fluid circuit used in a fumigation system in accordance with the present invention wherein alcohol must be used to develop full engine torque.

The alcohol pump AP used in FIG. 7 flow circuit, as well as in FIGS. 8, 9 and 10 flow circuits, is cooperably associated with the engine and is capable of supplying more alcohol than is needed, and therefore the alcohol output from the pump AP is controlled by the control valve 56. Alcohol from the alcohol pump AP is supplied to a source line 102 which is fluidly connected to counterbore 74 of the main alcohol control valve 56, and which branches at a T 106 to a conduit 110 which is fluidly connected to a shut-down valve SD2. The piston 66 seats against end 112 of the case 68 to prevent fluid communication between alcohol supply line 102 and an alcohol return line 114 when the piston is in the position shown in FIG. 7. Conduits 116 and 118 and a check valve CV1 complete the fluid circuit between shut-down valve SD2, which is operated by alcohol preference switch S, and air intake nozzle 32 positioned in the air intake means A1.

As can be seen from FIG. 7, the amount of alcohol supplied to the intake air system AI is related to the amount of alcohol by-passing the control valve 56. The amount of alcohol by-passing the control valve 56 is related to the degree with which the bore 74 is opened to the alcohol return line 114, which in turn, is a function of the spatial position of the piston 66 relative to the end 112 of the piston case 68.

The piston 66 is biased to the right in FIG. 7 by alcohol pressure, and to the left in that figure by primarily fuel pressure. The relative sizes of areas A1 and A2 are selected to give the desired functional relationship between these two pressures. Thus, as rail injection system pressure increases, alcohol pressure is increased a corresponding amount so the relationship between alcohol flow and diesel fuel flow shown in FIG. 4 is established.

Referring now to FIG. 8, a fumigation control system C is shown which controls alcohol flow according to the relationship discussed above in relation to FIGS. 5 and 6, that is, no alcohol is supplied to the engine until the engine load reaches a first predetermined percentage of full load, then the amount of alcohol supplied is gradually increased up to a first predetermined percentage of the total energy flow to the engine at an engine load of a second predetermined percentage load of full load, then controlled so that at full engine load a second predetermined percentage of the total energy flow to the engine is alcohol with the rest being diesel fuel. For the sake of example, the functional relationships shown in FIG. 5 will be used in the ensuing discussion. However, no limitation is intended.

Diesel fuel from the vehicle's fuel pump FP is supplied to the rail injector injection system R via a primary supply line 202 which fluidly connects the rail injector system R to a shut-down valve SD3 and to a pressure controlled flow regulator 210 which restricts pressure in the fuel rail injector system R proportionally to alcohol pressure by sensing alcohol pressure in a conduit 212 which is fluidly connected to a main delivery line 214 of an alcohol pump AP by T 216 a conduit 218, and a T 220. The flow regulator 210 includes a flow restrictor 230 which according to the position thereof relative to a seat 232 of a flow restrictor casing 234 permits specified amounts of diesel fuel to pass from section 236 of the primary supply line 202 into section 238 of that primary supply line via a counterbore 240. Movement of the flow restrictor 230 to the left in FIG. 8 permits more diesel fuel to flow to the shutdown valve SD3. The alcohol pressure in conduit 212 is sensed by a piston 244 and is applied to a face 246 of that piston to force the piston 244 to the right in FIG. 8. The piston 244 is mechanically coupled to the flow restrictor 230 to move that flow restrictor to the right in FIG. 8 as alcohol pressure in conduit 212 increases. The face 246 of the piston 244 is exposed to alcohol pressure and is sized relative to the size of the counterbore 240 to restrict diesel fuel pressure in accordance with a predetermined functional relation to alcohol pressure.

Alcohol is supplied to air intake means AI from alcohol pump AP via a three-way solenoid valve SV which includes an inlet port 250, and two outlet ports 252 and 254. In a normal mode, the solenoid valve SV fluidly connects inlet port 250 to outlet port 254 and closes the outlet port 252. In an energized mode, the solenoid valve connects inlet port 250 to outlet port 252. The outlet port 252 is fluidly connected to a check valve CV2 by a conduit 258, and air intake means AI is fluidly connected to the check valve CV2 by a conduit 259. Unless otherwise mentioned, it should be assumed that the solenoid valve SV is in the energized state so that inlet port 250 and outlet 252 are fluidly connected and outlet port 254 is blocked. As can be seen from the foregoing discussion, flow regulator 210 performs a function in the FIG. 8 flow circuit similar to the function performed by the dual power valve DP1 in the FIG. 7 flow circuit.

Thus far, the operation of the FIG. 8 fluid circuit is similar to that of FIG. 7 fluid circuit and alcohol from alcohol pump AP would be supplied to engine air intake means AI via three way solenoid valve SV in a similar fashion. However, the FIG. 8 fluid circuit includes a second pressure controlled flow regulator 260 which regulates flow of alcohol so that no alcohol is supplied to the air intake means AI until the engine reaches 25% of full load and then gradually permits more alcohol to be supplied to the air intake means until 50% of the total energy flow to the engine is alcohol at 50% full engine load.

The flow regulator 260 includes a piston 262 in a casing 264 which is fluidly connected to primary supply line 202 via a conduit 266 so that diesel fuel pressure in that supply line 202 is applied to a face 268 of the piston 262 to force that piston to the left in FIG. 8. A second face 270 of the piston 262 is mechanically coupled to a piston 274 slidably mounted in a case 276 which is fluidly connected to a gear pump of the engine by a conduit 280 connected to a gear pump conduit 282 at a T 284. Gear pump pressure is applied to a face 286 of the piston 274 to force that piston, and hence piston 262, to the right in FIG. 8.

The flow regulator 260 is fluidly coupled to the inlet port 294 of the alcohol pump AP by a conduit 290 and to conduit 212 by a conduit 292 so that, when the piston 262 is in the position shown therefor in FIG. 8, there is a flow path between conduits 218 and 290 which fluidly connects with a return line 294 of the alcohol pump AP. A further conduit 298 fluidly connects a face 300 of the piston 244 to the conduit 290 to maintain alcohol pump suction on the face 300.

According to the functional relationship shown in FIG. 5, once the engine exceeds 50% of full load, the alcohol flow is restricted so that at 100% engine load energy only 25% of the total flow is made up of alcohol. To accomplish this, another pressure controlled flow restrictor 310 is fluidly coupled to the gear pump line 282, to conduit 212 and to conduit 290. The flow restrictor 310 is similar to the flow restrictor 230 and thus includes a piston 312 exposed on a face 314 to gear pump pressure and having a counterbore 316 defined in a face 318 thereof which is exposed to alcohol pressure in conduit 212 so that as alcohol pessure in conduit 212 increases with respect to gear pump pressure, the piston 312 tends to move to the left in FIG. 8 to permit alcohol to by-pass the piston 312 and flow from conduit 212 to conduit 290 via conduit 320.

Until engine load reaches 50% of full load, the piston 312 of flow restrictor 310 remains seated against casing 324 so that alcohol flow is not affected by the flow restrictor 310. However, as soon as the engine load reaches 50% of full load, alcohol pressure, regulated by regulator 260, has increased such that the flow restrictor 310 begins to open to bleed alcohol from alcohol delivery line 218 and bleeds more alcohol as the engine load increases so that alcohol flow is controlled whereby, at full engine load, only 25% of the total flow energy is alcohol.

Until the flow restrictor 310 opens, alcohol flows from conduit 212 into conduit 292 to apply pressure to the face 270 of the piston 262. This alcohol flows into return line 294 via conduit 290 and affects the pressure differential across the piston 262. Alcohol pressure in conduit 290, which is return line suction, is also applied to piston 244 via conduit 298 to affect the pressure differential across piston 244 which affects the flow regulator 210 which restricts diesel fuel pressure in the delivery system according to alcohol pressure.

When the engine is operating at less than 25% of full load, flow regulator valve 260 is positioned as shown in FIG. 8 so that there is no flow restriction between conduits 290 and 292 so a "short circuit" appears in the flow path comprising alcohol pump AP, conduit 214, conduit 218, conduit 212, conduit 292, conduit 290 and return line 294.

As engine load increases, the pressure differential across piston 262 changes so that piston moves to the left in FIG. 8 and, eventually restricts conduit 290 so that alcohol pressure in the conduit 218 increases as the rail pressure in line 266 increases. However, when the conduit 290 is closed, pressure in conduit 212 is applied to regulator 310, which is sized to being opening the flow path between conduit 212 and conduit 320 when engine load reaches 50% of full load. Thus, some of the alcohol flowing in conduit 218 will be bled off back to the return line 294 via regulator 310 and conduit 320 thereby decreasing the amount of alcohol flowing to the air intake means AI via conduit 218. At the same time, the increased alcohol pressure in conduit 212 tends to move the piston 244 to the right in FIG. 8 thereby causing the flow restrictor 230 to decrease the amount of diesel fuel supplied to the rail injector system R by an amount corresponding to the increase in alcohol flow to the air intake means AI.

As engine load is increased beyond 50% of full load, the regulator 310 is sized to open gradually to maintain the alcohol flow in conduit 218 at a level which matches the curve shown in FIG. 5.

Using alcohol preference switch S, the alcohol system can be shut down so that all of the flow to the engine is made up of diesel fuel. This situation is indicated in FIG. 5 by the phantom lines.

A fumigation control system C" is shown in FIG. 9 and includes a single pressure controlled flow regulator 400 to effect the fumigation schedule shown in FIG. 5. The fluid circuit shown in FIG. 9 includes a fuel pump FP supplying diesel fuel to rail injector system R via primary supply lines 404 and 405, a dual power valve DP4 and a shut-down valve SD6 which are controlled respectively by alcohol preference switch S and key switch K.

Pressure in the rail injector system is applied via conduits 406 and 408 and a shut-down valve SD8 to a face 410 of a piston 412 in flow regulator 400 to force that piston toward the left in FIG. 9. Alcohol from alcohol pump AP is supplied to air intake means AI via the flow regulator 400 and a check valve CV4, and pressure in the alcohol system is applied to a face 416 of the piston 412 to force that piston to the right in FIG. 9 against the force resulting from the pressure in the rail injector system R. The flow regulator 400 includes a casing 418, and the alcohol pump AP is fluidly connected to the flow regulator 400 by a conduit 420 and a port 422 defined in the casing 418 and to the air intake means AI via conduits 424 and 425 and a port 426 defined in the casing 418.

The alcohol pump AP in the FIG. 9 flow circuit, like the other flow circuits disclosed herein, is capable of supplying more alcohol than is required, and the regulator 400 is sized so that no alcohol is supplied to conduit 424 until engine load reaches 25% of full load. This is accomplished by including a second piston 430 in the flow regulator 400 which has a first face 432 exposed to alcohol pressure in conduit 420 and is mechanically coupled to the piston 412 by an arm 436 which abuttingly contacts face 432 of the piston 430.

The piston 430 has a second face 440 which is mechanically coupled to an arm 442 which has a face 446 exposed to gear pump pressure in a conduit 450. An alcohol vent line 454 is fluidly connected to the flow regulator casing 418 by a port 456 and is in fluid communication with the piston second face 440. With the fluid circuit shown in FIG. 9, gear pump pressure applied to face 446 tends to force the arm 442 and the piston 430 to the right in FIG. 9 against the pressure applied to the face 410 of the piston 412 by the pressure in the rail injector system R.

An alcohol by-pass conduit 460 fluidly connects faces 432 and 440 of the second piston 430 to fluidly connect alcohol supply line 420 to alcohol vent line 454 and thereby "short" the fluid circuit between the alcohol pump AP and the air intake means AI. However, in the position shown in FIG. 9, face 462 of the arm 436 blocks the by-pass conduit 460. As will be evident from the ensuing discussion, at the appropriate engine load, the by-pass conduit becomes unblocked. A diesel fuel vent system includes a conduit 470 fluidly connected to the casing 418 by a port 472 and fluidly connects the flow regulator 400 to the vent in fuel pump FP. An orifice 474 in the conduit 470 controls flow in that conduit.

The elements of the flow regulator 400 are sized so that the pistons 412 and 430 remain in the position shown in FIG. 9 blocking ports 426 and 472 but opening the by-pass line 460 so that no alcohol is supplied to the air intake means AI until engine load reaches 25% of full load. When engine load exceeds 25% of full load, pressure in the rail injector system R overcomes gear pump pressure acting on the face 446 and amount sufficient to move the pistons 412 and 430 to the left of FIG. 9 and hence to unblock ports 426 and 472 whereby some diesel fuel is bled from the main supply line 404 and a corresponding amount of alcohol is added to the air intake means.

The pistons 412 and 430 continue to move to the left of FIG. 9, and as engine load increases to 50% of full load piston 412 reaches stop 480 and the alcohol pressure does not increase with increases engine load so that at 50% engine load, 50% of the total energy supplied to the engine is alcohol.

When the engine load reaches 50% of full load, piston 412 abuts a stop ring 480 and is prevented from moving any farther to the left of FIG. 9. Piston 430 is not so controlled, and as engine load is increased thereby increasing alcohol pressure applied to face 432 of the piston 430, the piston 430 continues to move to the left of FIG. 9. Such movement of the piston 430 unblocks the by-pass conduit 460 thereby permitting some alcohol to flow from supply line 420 to vent line 454 without flowing into conduit 424. Thus, the total amount of alcohol supplied to air intake means AI is controlled by the amount of alcohol by-passing outlet port 426, and the fumigation schedule shown in FIG. 5 will be followed. A stop ring 482 prevents piston 430 from blocking the alcohol supply line 420. The orifice 474 prevents dumping all of the pressure in the rail injector system R when the port 472 is unblocked, and is selected to control the flow of diesel fuel back to the fuel pump FP in accordance with the fumigation schedule so that desired decreases in diesel fuel are established when alcohol is being added to make up those diesel fuel decreases.

The shut-down valve SD8 is also controlled by the alcohol preference switch S so that the alcohol system shown in FIG. 9 can be shut down and all of the fuel supplied by the diesel fuel system.

A fumigation control system C''' is shown in FIG. 10, and is similar in operation to the fumigation system C'' shown in FIG. 9 except that there is no alcohol preference switch and no valves associated with such an element. Thus, fumigation system C''' requires that alcohol be used and the fumigation schedule shown in phantom lines in FIG. 5 cannot be followed using the fumigation system shown in FIG. 10.

Figure 11:
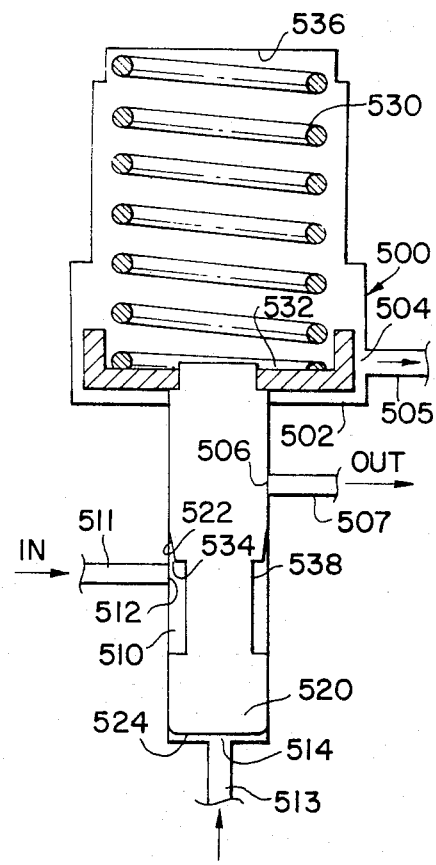
FIG. 11 is a schematic representation of a speed effect device for use in a fumigation system in accordance with the present invention to control addition of secondary fuel according to engine speed.

Engine speed can be used affect control of secondary fuel flow in the circuits of FIGS. 8, 9 and 10 through speed effect device 500 shown in detail in FIG. 11. Referring to FIG. 11, it is seen that the speed effect device 500 includes a housing 502 which is vented to the suction portion of an associated alcohol pump through port 504 and a conduit 505 and to alcohol injection means AI through port 506 and conduit 507. Alcohol from the associated alcohol pump is supplied to a piston chamber 510 via conduit 511 and a port 512 which is in fluid connection with the associated primary alcohol pressure regulators, which control alcohol flow according to engine load as above discussed, and gear pump pressure is applied to the housing via a conduit 513 and a port 514 which is fluidly connected to conduits, such as conduit 282 in FIG. 8 and 450 in FIGS. 9 and 10 which are fluidly connected to the gear pump of the fuel pump FP.

A regulating plunger 520 is located in the housing 502 and has a surface 522 exposed to alcohol pressure in the port 512 and a face 524 exposed to gear pump pressure in port 514. Gear pump pressure on the plunger 520 is a measure of engine speed and is opposed by a spring 530 seated on end 532 of the plunger 520 and on a housing end 536. The surface 522 includes a chamfer 534 adjacent to port 512 and a groove 538 adjacent to the chamfer 534.

Spring preload is adjusted such that all alcohol delivery to the engine is blocked at or below a predetermined minimum gear pump pressure. Such effect is illustrated in FIG. 11 wherein the plunger 520 blocks any fluid communication between ports 506 and 512. However, as engine speed increases, gear pump pressure increases thereby moving the plunger 520 upwardly in FIG. 11. At a predetermined engine speed, some fluid communication between ports 506 and 512 is established by the chamfer 534, and alcohol is delivered to the engine at a predetermined rate.

As engine speed increases, the chamfer 534 permits higher alcohol flow rates, and at a predetermined maximum engine speed as represented by a predetermined maximum gear pump pressure, fluid communication between the ports 506 and 512 is established via the groove 538 which permits essentially unrestricted flow from the alcohol load regulator system to the engine.

Thus, at or below a first predetermined engine speed, no alcohol is supplied to the engine regardless of what percentage of full load at which the engine is operating, and at a second predetermined engine speed, alcohol is supplied to the engine strictly according to the percentage of full load at which the engine is operating, as above discussed with regard to the control systems C, C', C'' and C''', and between these predetermined engine speeds, alcohol is supplied to the engine according to a relationship which includes a factor set according to the percentage of full engine load by the control systems C, C', C'' or C''' plus an engine speed factor set by the speed effect device 500. The control factor contributed by the device 500 can be varied for a given spring by varying the physical dimensions of the chamfer 534.

Figure 12A:
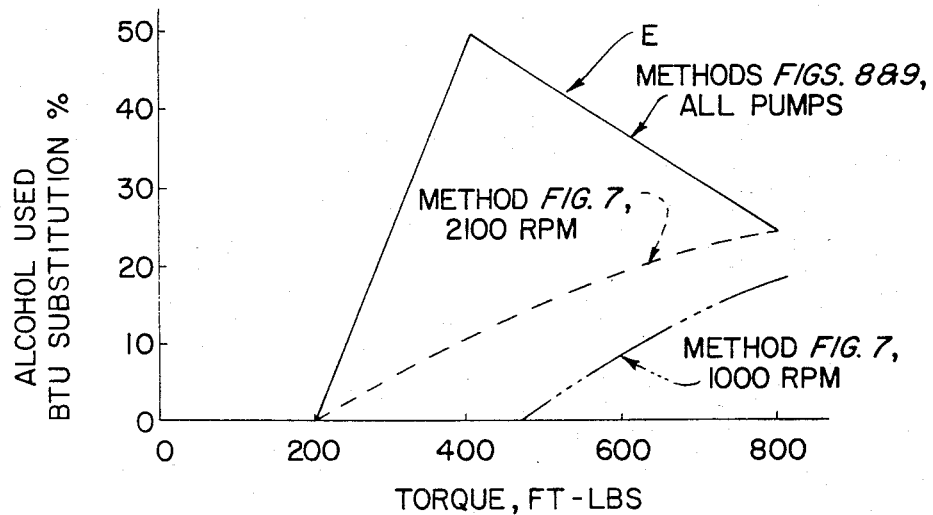
FIGS. 12(a) and (b) are graphical representations of fumigation schedules which include control according to both engine load and engine speed.
Figure 12B:
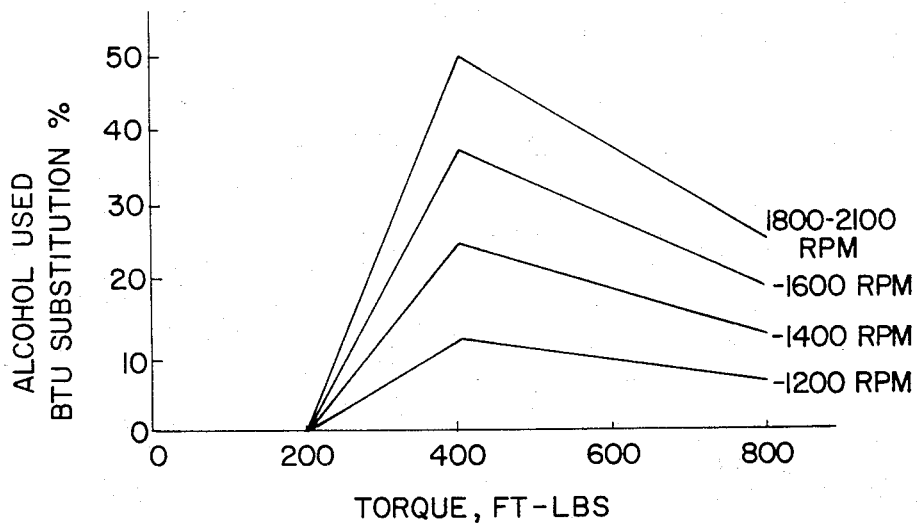

Examples of typical alcohol substitution curves with the speed effect device 500 in place is presented in FIG. 12(b). Referring to FIG. 12(b), the systems shown in FIGS. 8, 9 and 10 are represented with control according to engine speed as shown. There is no alcohol delivery below 1000 RPM engine speed, there is a 75% reduction from the basic curve of 1200 RPM, a 50% reduction at 1400 RPM and a 25% reduction at 1600 RPM and full substitution at 1800-2100 RPM. The full line curve E shown in FIG. 12 (a) represents the alcohol substitution schedule for all engine speeds as controlled by the fumigation controls shown in FIGS. 8, 9 and 10.

The phantom lines 1000 and 2100 in FIG. 12(a) represent alcohol delivery for the overall configuration, shown in FIG. 7 at 1000 RPM and 2100 RPM engine speeds respectively. While no speed effect device is included in the preferred form of FIG. 7, such device could be included in conduit 102 upstream of shut-down valve SD2 if suitable. The curves 1000 and 2100, therefore, represent the inherent speed effect produced by the spring 76 on the regulation system C shown in FIG. 7, and there is no alcohol substitution with this system below 600 RPM engine speed.

It is noted that the curves shown in FIGS. 12(a) and 12(b) are merely representative of the relationships which can be established, and are not intended as limitations. It is further noted that the just-discussed percentage reductions in alcohol delivery do not change the inflection points of the basic alcohol delivery curves (FIGS. 4, 5 and 6) when alcohol is being delivered to the engine.

INDUSTRIAL APPLICABILITY

While the present invention has been disclosed hereinabove as a system for adding alcohol to a diesel engine, other secondary fuels and other internal combustion engines can also be used. Th preferred system uses ethanol or methanol, but other alcohols can also be used without departing from the scope of the present disclosure. Furthermore, other diesel fuel injector systems can be used without departing from the scope of the present invention, and engine fuel pumps and accessories other than those manufactured by the Cummins Engine Company of Columbus, Ind. can be used. Still further the supercharger compressor can be crankshaft driven or turbine driven.

We claim:

1. A method of partially replacing the primary fuel supplied to an internal combustion engine having an intake air means, a combustion chamber with the primary fuel being supplied to the combustion chamber through an injector which meters the amount of fuel injected into the combustion chamber in response to variation in pressure of fuel supplied to the injector, comprising the step of preventing addition of secondary fuel to the air intake means until engine load reaches 25% of full load, further including a step of gradually increasing the amount of secondary fuel supplied to the engine while correspondingly increasing an amount of the primary fuel supply that is diverted from the engine in a manner causing the proportion of secondary fuel to increase from zero percent to fifty percent of the total amount of fuel supplied to the engine as engine load increases from 25% of full load to 50% of full load.

2. The method as defined in claim 1 further including a step of adjusting the amount of secondary fuel supplied to the intake air means to diminish to 25% of the total amount of fuel supplied to the engine at full engine load after engine load exceeds 50% of full load, said step of adjusting being performed while the diverted amount of the primary fuel supply remains unchanged.

3. A means for partially replacing the primary fuel supplied to an internal combustion engine having an intake air means, a combustion chamber with the primary fuel being supplied to the combustion chamber through an injector which meters the amount of fuel injected into the combustion chamber in response to variation in pressure of fuel supplied to the injector, comprising:

first means for preventing addition of secondary fuel to the air intake means until engine load reaches 25% of full load; and second means for gradually increasing the amount of secondary fuel supplied to the engine while correspondingly increasing the amount of the primary fuel supply that is diverted from the engine in a manner causing the proportion of secondary fuel to increase from zero percent to fifty percent of the total amount of fuel supplied to the ending as engine load increases from 25% to 50% of full load.

4. The means defined in claim 3 further including a third means for adjusting the amount of secondary fuel supplied to the air intake means to diminish to 25% of the total mount of fuel supplied to the engine at full engine load while the diverted amount of the primary fuel supply remains unchanged.

5. A fuel replacement means for use in a diesel engine for controllably replacing diesel fuel supplied to combustion chambers of the diesel engine by a secondary fuel comprising:
- a diesel fuel rail injection means fluidly connecting a fuel pump to the combustion chambers for supplying diesel fuel to the diesel engine combustion chambers;
- an air intake means fluidly connected to the diesel engine combustionn chambers for supplying air to these combustion chambers;
- a secondary fuel supply system fluidly connected to said air intake means for supplying secondary fuel to the combustion chambers via said air intake means, said secondary fuel supply system including a first pressure controlled voltage means comparing diesel fuel pressure in said rail injection means against secondary fuel pressure in said secondary fuel supply system and controlling the flow of secondary fuel to said air intake means in response to said comparison, wherein said first pressure controlled valve means includes a first piston means fluidly connected to said secondary fuel supply system and to said rail injection means for comparing fluid pressure in said secondary fuel supply system to fluid pressure in said rail injection means, and further including a gear pump associated with said fuel pump and wherein said first pressure controlled valve means further includes a second piston means mechanically coupled to said first piston means and fluidly connected to said secondary fuel supply system and to said gear pump for comparing gear pump pressure to pressure in said secondary fuel supply system.

6. The fuel replacement means defined in claim 5, wherein said second piston means includes a by-pass conduit for fluidly connecting a supply line in said secondary fuel supply system to a return line in said secondary fuel supply system when engine load reaches a predetermined value.

7. The fuel replacement means defined in claim 6, further including a diesel fuel vent means fluidly connecting said first pressure controlled valve means with said fuel pump.

8. The fuel replacement means defined in claim 7, wherein said rail injection means includes a dual power valve for controlling the amount of diesel fuel supplied to the combustion chambers in accordance with the amount of secondary fuel supplied to said air intake means.

9. The fuel replacement means defined in claim 5, wherein said secondary fuel supply system includes a shut-down valve for shutting off supply of secondary fuel to said air intake means independently of said pressure controlled valve means.

10. The fuel replacement means defined in claim 9, further including a check valve fluidly connecting said first pressure controlled valve means to said air intake means.

11. The fuel replacement means defined in claim 5, further including means for preventing injection of secondary fuel into said air intake means when the engine is idling.

12. The fuel replacement means defined in claim 5, wherein said secondary fuel includes alcohol.

13. The fuel replacement means defined in claim 7, wherein the secondary fuel includes ethanol.

14. The fuel replacement means defined in claim 7, wherein the secondary fuel includes methanol.

15. The fuel replacement means defined in claim 5, wherein said secondary fuel system includes a preference switch for selectively turning said secondary fuel system on and off.

16. The means for partially replacing the primary fuel supplied to an engine defined in claim 3, wherein secondary fuel injection means is provided for supplying the secondary fuel into a scroll region of a supercharger that is fluidically connected to air intake means of the engine.

17. The means for partially replacing the primary fuel supplied to an engine defined in claim 16, wherein said injection means is located to inject secondary fuel less than two inches from an impeller of said compressor of the supercharger.

18. The fuel replacement means defined in claim 5, wherein said intake air means includes a turbosupercharger.

19. The fuel replacement means defined in claim 17, wherein said secondary fuel injection means includes a liquid pressure atomizing nozzle.

20. The fuel replacement means defined in claim 3, further comprising a speed effects means for controlling flow of said secondary fuel in accordance with engine speed.

21. The fuel replacement means defined in claim 20, wherein said speed effects means includes first flow control means for blocking flow of said secondary fuel until engine speed reaches a first predetermined value, then controllably permitting flow of said secondary fuel until engine speed reaches a second predetermined value.

22. The fuel replacement means defined in claim 21, wherein said speed effects means further includes second flow control means for permitting flow of secondary fuel to said supercharger which is not controlled according to engine speed when engine speed reaches a third predetermined value.

23. The fuel replacement means defined in claim 21, wherein said first flow control means includes a chamfered spring biased regulating plunger.

24. The fuel replacement means defined in claim 22, wherein said second flow control means includes a grooved spring biased regulating plunger.

25. The method defined in claim 1, further including an additional step of controlling flow of secondary fuel to the air intake means in accordance with engine speed.

26. The method defined in claim 25, wherein said additional step includes preventing flow of secondary fuel to the air intake means until engine speed reaches a first predetermined speed.

27. The method defined in claim 26, wherein said additional step further includes controlling flow of said secondary fuel to the air intake means in accordance with engine speed until engine speed reaches a second predetermined speed.

28. The method defined in claim 27, wherein said additional step further includes preventing control of secondary fuel flow in accordance with engine speed after engine speed reaches a third predetermined speed.

* * * * *